United States Patent Office 2,985,621
Patented May 23, 1961

2,985,621

LIGHT STABILIZED POLYAMIDE

Jürgen Brandes, Wiesbaden, and Rudolf Gewehr, Obernburg (Main), Germany, assignors to Vereinigte Glanzstoff-Fabriken A.G., Wuppertal-Elberfeld, Germany No Drawing. Filed Apr. 22, 1959, Ser. No. 807,983

Claims priority, application Germany Apr. 25, 1958

9 Claims. (Cl. 260—45.75)

This invention relates to a polyamide which has been stabilized to prevent discoloration and deterioration by the action of light. In particular, the invention is concerned with the incorporation of a stabilizing agent in a polyamide, said agent being especially compatible with the polyamide and providing improved light stabilization properties.

It is known that polyamide structures or shaped articles such as filaments, films, tubes, molded bodies and the like are sensitive to sunlight, especially when they contain a delustering agent, usually a white pigment such as finely divided titanium dioxide. The light sensitivity of these polyamide products severely reduces their utility. This sensitivity is evidenced not only by discoloration but also by a reduction in such properties as tensile strength and elongation with an increasing duration of exposure to light. Oxygen and dampness will further accelerate the deteriorating effect of light.

In textile applications, an increasing yellowing or other discoloration of polyamide fibers or filaments is an extremely deleterious feature. Delustered polyamide materials are probably most sensitive to light because the titanium dioxide or similar delustrant has a high index of refraction, and the light therefore travels over or covers a longer path in the material. Such increased exposure to light has a concentrated or greater cumulative effect as compared to non-pigmented polyamides.

In order to improve the light stability of polyamides, especially those containing a titanium dioxide delustrant, it has been proposed that certain heavy metal salts be incorporated in the polymer, salts of manganese ordinarily being preferred. Manganese acetate has thus been found to be most effective in practice.

The optimum quantity of the heavy metal salt is governed primarily by the type and quantity of delustering agent contained in the polyamide material. However, optimum results have been obtained only within a narrow range of quite small quantities of heavy metal salts such as manganese acetate. Table I sets forth the results which have been obtained with this particular stabilizing agent in a polyamide filament of fabric which contains as a delustrant about 2% by weight of TiO$_2$.

In Table I and the following tables and examples, the stabilizing additive is calculated on the basis of the metal, e.g. as percent by weight of manganese where a manganese salt is employed. The whiteness degree of the fabric produced from polyamide filaments is calculated from remission degrees according to the formula:

$Wg$ (degree of whiteness)=$2 \times Rg$-filter 460 m$\mu$—$Rg$-filter 620 m$\mu$. The remission degrees were measured with a Zeiss Elrepho.

TABLE I

Source of light exposure: Philips TL 40 W/33 fluorescent tubes.
Time of exposure: 265 hours.

| Polyamide Filament or Fabric, deep luster, Td 100/30 | Initial strength, g./den. | Final strength, g./den. | Impairment, Percent | Whiteness Degree of the Silk |
|---|---|---|---|---|
| Without additive | 4.7 | 1.85 | 60.6 | 79.2 |
| With additive of 6.6×10⁻⁴ percent Mn | 4.7 | 3.24 | 31.7 | 78.6 |
| With additive of 5.0×10⁻³ percent Mn | 4.8 | 3.65 | 24.4 | 72.5 |
| With additive of 1.0×10⁻¹ percent Mn | 4.7 | 4.18 | 11.0 | 68.5 |

It will be noted in Table I that the light protecting or stabilizing effect of manganese acetate increases sharply with an increasing content of manganese in the polyamide material. It is quite apparent that it would be most desirable to employ as high a quantity as possible of manganese acetate in order to reduce light damage to a minimum. However, a large addition of manganese acetate or other previously known heavy metal salts is impossible in practice, especially in textile applications, because the heavy metal salts in higher amounts lead to a very severe and undesirable discoloration. This discoloration may be caused by the salts themselves or by chemical reaction of the salts during exposure to light. Even when manganese compounds such as manganese acetate, carbonate, salicylate, adipate and others are added to the liquid monomer or spinning solution, e.g. a liquid caprolactam, a brown coloration appears which unfavorably affects the degree of whiteness of the subsequently spun or molded polyamide. Therefore, a high dosage or content of manganese or other heavy metal has not previously been possible.

With the results of Table I, it can be observed that quantities of manganese acetate greater than 0.01% by weight based upon manganese lead to a brown discoloration, probably because of the formation of manganese oxide. Certain heavy metal salts also cause a severe grey discoloration, especially in those cases where the polyamide is exposed to moist air or a sulfur-containing industrial atmosphere. The same results can be observed with sulfurous bleaching agents. In these instances, the greying is several times more severe than would be obtained with an untreated polyamide product. Manganese dioxide and cobalt sulfide appear to be the most objectionable impurities which can be formed in a polyamide which has been treated with heavy metal salts.

One object of the present invention is to provide a new and improved polyamide composition containing as a light stabilizing agent a specific class of compounds which will fully protect the polyamide without causing objectionable discolorations.

Another object of the invention is to provide a stabilized polyamide which will retain its desired properties of tensile strength and elongation even after a relatively long exposure to light.

Yet another object of the invention is to provide specific stabilizing agents having a high degree of compatibility with a polyamide material.

These and other objects and advantages of the invention are more clearly and completely set forth in the following detailed description.

In accordance with the invention, it has now been found that polyamide materials can be given an excellent light stability by incorporating or combining therewith a complex polyphosphate salt of a heavy metal as a stabilizing agent. The heavy metal complex polyphosphate salts can be added at any time during the production of the polyamide, e.g. they can be mixed with the monomer, incorporated during polymerization to the polyamide or finely dispersed in the polyamide product.

As heavy metals, there may be used those which have previously been recognized as having a stabilizing effect upon polyamides, and especially manganese, cobalt, nickel, copper and chromium. The term "heavy metals" refers to those having a specific density of about 7 or above.

The complex compounds employed herein as a stabilizing agent are most easily prepared by reaction of a simple heavy metal salt such as manganese acetate with a sodium polyphosphate such as sodium tripolyphosphate and hexapolyphosphate or sodium hexametaphosphate. The resulting complex compound is a heavy metal polyphospate salt. The term "polyphosphate" is employed herein to refer to both the polyphosphates and the polymetaphosphates, and the sodium polyphosphates can probably be represented by one of the formulae:

$(NaPO_3)_m$ wherein $m$ is an interger greater than 3; and $Na_3PO_4(NaPO_3)_n$ wherein $n$ is an integer greater than 1.

In both of these formulae, the sodium is replaced by a heavy metal such as manganese, cobalt or the like to form the complex polyphosphates of the invention. The exact formula of the metal polyphosphate complexes is only theoretical, but these compounds in the form of their complex sodium salts are well known water conditioning agents.

The reaction to form the heavy metal complexes is preferably carried out initially in an aqueous solution containing the reactant salts and the complex product then added to the polyamide material. However, the sodium polyphosphate and heavy metal salt reactants can also be added separately or together to the polyamide or even to the monomer, such as ε-caprolactam, and the complex polyphosphate salt of the heavy metal is then formed in situ.

In referring to polyamides, the present invention is especially concerned with the long chain polyamides which can be drawn and oriented to form useful artificial fibers or similar products, including films or tapes. The most common polyamides are polyhexamethylene adipamide and polycaprolactam, but other suitable fiber-forming polyamides are also known as, for example, that which is prepared from sebacic acid and hexamethylene diamine, sometimes called nylon 610. Still other polyamides may have N-substituted alkyl side groups in the polymer chain. A more complete description of these polyamides can be found in "Artificial Fibres" by Moncrieff, 2nd Edition, John Wiley & Sons, Inc., New York (1954), pp. 231–263.

It was quite surprising to find that a complex polyphosphate salt of a heavy metal could show such a pronounced improvement over the simple salts of the corresponding heavy metal when employed as light stabilizing agents for polyamides. Manganese and cobalt complex polyphosphates are particularly preferred stabilizing agents and can be employed in a quantity sufficient to almost fully maintain light stability without any serious discoloration or other side reaction of the stabilizing agent itself. A similar improvement is shown with other heavy metal polyphosphates when comparing the corresponding simple salts of the same metals. It is especially important that the polyphosphate complex salts of heavy metals can be added to the polyamide material in quantities which are substantially higher than has previously been practical with simple heavy metal salts.

In general, only very small quantities of the complex heavy metal polyphosphates are required to produce an effective stabilization against the action of light. Where tensile strength is not an important factor, a quantity as low as about 0.005% by weight, calculated as the heavy metal, is sufficient to provide satisfactory results. Where deterioration of tensile strength is to be avoided, a minimum quantity of about 0.015% by weight, calculated as the heavy metal, is preferred in order to obtain optimum results. The maximum quantity is not critical since no discoloration or reduction of whiteness occurs with the complex salts of the invention, as directly contrasted to the low maximum content of the simple salts. The upper limit of the polyphosphate complex salt is ordinarily selected for economical reasons, i.e. after a sufficient quantity has been added to substantially stabilize the polyamide, extra quantities do not show enough further improvement to warrant the additional cost.

The improved utility of the complex heavy metal polyphosphates is more clearly illustrated in Table II, wherein it is clearly shown that high concentrations of manganese can be employed without reducing the degree of whiteness of the polyamide fabric, thereby permitting an almost complete stabilization against light.

TABLE II

Source of light exposure: Philips TL 40 W/33 fluorescent tubes.
Time of exposure: 265 hours.

| Polyamide Filament or Fabric, deep luster, Td 100/30 | Initial strength, g./den. | Final strength, g./den. | Impairment, percent | Whiteness Degree of the Fabric |
|---|---|---|---|---|
| Without additive | 4.7 | 1.85 | 60.5 | 79.2 |
| With additive of 5.0×10⁻⁴ percent Mn | 4.8 | 3.01 | 35.4 | 79.0 |
| With additive of 5.0×10⁻³ percent Mn | 4.7 | 3.65 | 22.3 | 79.3 |
| With additive of 1.0×10⁻² percent Mn | 4.7 | 4.18 | 11.0 | 78.9 |
| With additive of 2.0×10⁻² percent Mn | 4.8 | 4.65 | 3.1 | 79.0 |

The invention is further illustrated by the following examples wherein parts and percentages are by weight unless otherwise indicated. These examples are intended to be illustrative only and are not to be considered as exclusive.

*Example 1*

A solution of manganese acetate in water was prepared so as to contain 0.25 gram of manganese. To this solution there was then added another aqueous solution of sodium hexametaphosphate, $(NaPO_3)_6$, such that the quantity of the polyphosphate is 1.2 times the quantity of manganese acetate, with reference to the weights of the individual reactants. The precipitate or deposit which initially forms is completely dissolved in the 1.2-fold excess of sodium hexametaphosphate. The solution thereby contains manganese hexametaphosphate as a complex salt.

A polycaprolactam which has been delustered with 2% titanium dioxide in anatase form was then added in the form of cuttings to the solution in a quantity of 5 kilograms. These cuttings were well mixed with the solution, and the previously formed manganese hexametaphosphate applied to the cuttings by evaporation of the solution in a drying cabinet at 105° C. to a moisture content on the polycaprolactam of about 0.06–0.10%.

The treated cuttings were spun by a conventional spinning process. The filaments produced thereby had an excellent degree of whiteness and even after long exposure to light gave no signs of yellowing. Also, no serious impairment of tensile strength or elongation could be observed.

Filaments prepared in the same manner but with the same quantity of manganese acetate incorporated therewith, i.e. having the same amount of manganese, gave a considerably smaller degree of whiteness.

The advantage of the manganese hexametaphosphate additive is illustrated by the following results according to the above two experiments:

| Experiment | Additive | Degree of Whiteness | |
| --- | --- | --- | --- |
| | | Initial | After 3 Months' Daylight |
| 1 | Manganese hexametaphosphate | 79.3 | 75.2 |
| 2 | Manganese acetate | 72.5 | 53.7 |

The degree of whiteness was determined with knitted fabrics TD 100/30.

*Example 2*

The procedure of Example 1 was repeated except that the manganese complex compound was replaced by the corresponding cobalt complex compound. The degree of whiteness was again determined and tabulated as follows:

| Experiment | Additive | Degree of Whiteness | |
| --- | --- | --- | --- |
| | | Initial | 2 Months' Daylight |
| 3 | Cobalt hexametaphosphate | 78.9 | 76.7 |
| 4 | Cobalt acetate | 73.5 | 61.3 |

From the foregoing tables and examples, it will be readily recognized by those skilled in this art that the polyphosphate complex salts are quite superior to such simple salts as the acetate in a comparison of the same heavy metals. No inherent or substantial discoloration, either initially or after aging in light, occurs with the complex additives used in the present invention. Furthermore, larger quantities of these complex additives can be safely used to maintain the physical properties of the polyamide. Polyamides which have been treated in accordance with the invention lead to various shaped, molded or spun polyamide products having an enhanced consumer appeal.

The invention is hereby claimed as follows:

1. A composition of matter comprising a polyamide and a complex polyphosphate salt of a heavy metal selected from the group consisting of manganese, cobalt, nickel, copper and chromium as a light stabilizing agent for said polyamide.

2. A composition of matter comprising a polyamide, a delustering agent, and a complex polyphosphate salt of a heavy metal selected from the group consisting of manganese, cobalt, nickel, copper and chromium as a light stabilizing agent for said polyamide.

3. A composition of matter as claimed in claim 2 wherein the heavy metal is manganese.

4. A composition of matter as claimed in claim 2 wherein the heavy metal is cobalt.

5. A composition of matter comprising a polyamide containing intimately dispersed therewith a titanium dioxide delustering agent and as a light stabilizing agent a complex polyphosphate salt of manganese.

6. A composition of matter comprising a polyamide containing intimately dispersed therewith a titanium dioxide delustering agent and as a light stabilizing agent a complex polyphosphate salt of cobalt.

7. A polyamide shaped article containing about 2% by weight of titanium dioxide as a delustering agent and a complex polyphosphate salt of a heavy metal selected from the group consisting of manganese, cobalt, nickel, copper and chromium as a light stabilizing agent in an amount of at least about 0.005% by weight, calculated as the heavy metal.

8. A polyamide shaped article as claimed in claim 7 wherein the heavy metal is manganese.

9. A polyamide shaped article as claimed in claim 7 wherein the heavy metal is cobalt.

References Cited in the file of this patent

UNITED STATES PATENTS 2,887,462    Van Oot      May 19, 1959

FOREIGN PATENTS 955,259    France      June 27, 1949